United States Patent
Paulsen

(10) Patent No.: US 10,499,630 B2
(45) Date of Patent: Dec. 10, 2019

(54) DIAMOND FLY AND SMALL OBJECT CONTROLLER

(71) Applicant: Randall L. Paulsen, Fernley, NV (US)

(72) Inventor: Randall L. Paulsen, Fernley, NV (US)

( * ) Notice: Subject to any disclaimer, the term of this patent is extended or adjusted under 35 U.S.C. 154(b) by 0 days.

(21) Appl. No.: 15/921,378

(22) Filed: Mar. 14, 2018

(65) Prior Publication Data

US 2019/0281806 A1    Sep. 19, 2019

(51) Int. Cl.
*A01M 3/00* (2006.01)
*B65D 33/06* (2006.01)
*B65D 30/00* (2006.01)

(52) U.S. Cl.
CPC .............. *A01M 3/002* (2013.01); *B65D 29/00* (2013.01); *B65D 33/06* (2013.01)

(58) Field of Classification Search
CPC .... A01K 23/005; A01K 77/00; A01K 63/006; E01H 1/1206; A01M 3/002; B65D 33/06; B65D 29/00
See application file for complete search history.

(56) References Cited

U.S. PATENT DOCUMENTS

| | | |
|---|---|---|
| 1,346,021 A | 7/1920 | Harris |
| 1,462,416 A | 7/1923 | McDermott |
| 1,623,006 A | 3/1927 | Hamborg et al. |
| 1,718,805 A | 6/1929 | Wilkie et al. |
| 2,247,791 A | 7/1941 | Sundquist |
| 2,604,723 A | 7/1952 | Bennett |
| D214,317 S * | 6/1969 | Axelrod ............... D22/135 |
| 3,747,250 A * | 7/1973 | Willinger ............. A01K 77/00 43/11 |
| 4,063,380 A * | 12/1977 | Grim .................. A01K 77/00 43/11 |
| 4,251,938 A * | 2/1981 | Goldman ............. A01K 77/00 43/11 |
| 4,262,662 A * | 4/1981 | Allinson .............. A61F 5/41 600/39 |
| 4,392,570 A * | 7/1983 | Willinger ............. A01K 77/00 206/231 |
| 4,776,129 A | 10/1988 | Kelly |
| 5,131,178 A | 5/1992 | Stoliar et al. |
| 2008/0289582 A1* | 11/2008 | Rutherford ......... A01K 63/006 119/245 |

OTHER PUBLICATIONS

Toys Delivered Monthly, Bug Nets, (Downloaded from https://www.amazon.com/Bug-Nets/dp/ 801 G92H FHS/ref=sr_ 1_81_sspa?ie= UTF8&qid= 1517952684&sr= 8-81-spo ns&keywords= insect+ net +catcher&psc= 1 on Feb. 12, 2018) [Original date unknown].
Illuminet, Illuminet Critter Net, (Downloaded from httpsJ/WI\W.ilmu2on.com;Illuminet Cmbbing Shelling Iluminuted Butterfly/dp/B00KUBU9Y5/ref=sr_I_82_sspu?ie=UTF3&qid= 1517952689 &sr=8 82 spons&key~1ords=insect, net, cJtcher&psc= I on Feb. 12, 2018) [Original date unknown].

* cited by examiner

*Primary Examiner* — Stephen A Vu
(74) *Attorney, Agent, or Firm* — J. Carl Cooper

(57) ABSTRACT

An apparatus for use by a human to bag, transport and release a small object without the human touching the object, the apparatus including an open ended flexible net bag supported by a frame having an opening, the frame including a handle with which a person maneuvers the open end to bag the object, transport the bagged object and release the bagged object.

20 Claims, 6 Drawing Sheets

DIAMOND FLY AND SMALL OBJECT CONTROLLER

CROSS REFERENCES TO RELATED APPLICATIONS

[None]

STATEMENT REGARDING FEDERALLY SPONSORED RESEARCH OR DEVELOPMENT

[N/A]

FIELD OF INVENTION

The invention relates to the general field of bagging one or more object without having to touch the object with the hand, for example, inanimate items like small parts, toys or dropped pieces of food and animate things like arthropods, which objects are undesirably present in or about human occupied structures.

BACKGROUND OF THE INVENTION

Many humans commonly find undesirable pests, for example arthropods such as flies, spiders and millipedes in and about their homes, work and other areas which they occupy. Fly swatters are commonly used for the task of dispatching these pests but create a messy biohazard by squashing them and the cleanup of the squashed pest is an undesirable task. Further, some humans wish to merely remove the pest to another location without killing or harming it.

Bug sprays, and other chemicals are sometimes used for repelling, removing or killing pests but those can create a chemical hazard when used, and with some, the dead pest often is still left to be removed. Further these chemicals must be replaced periodically and the cost as well as the exposure to a human or pet during application can be undesirable. Pest control services can be engaged to take over the task of preventing or removing undesirable pests but they can be costly and they do not eliminate all of the above potential problems. Other means of performing the task of removing pests can be unpleasant, costly, time-consuming, awkward and/or potentially dangerous.

Additionally, tasks of cleaning up or collecting undesirable inanimate items, for example such as droppings from animate things as well as dropped or spilled pieces of edible human or pet items, can be difficult or undesirable using one's hands and fingers. Further, picking up items such as small toys which are left on the floor can involve bending, stooping and other physical exertion which causes pain or risks injury by falling and is thus undesirable.

DESCRIPTION OF RELATED ART

In addition to the above, there are other various devices, for example such as brooms, dust pans, rotating floor brushes, vacuum cleaners, sticky surfaces, nets and bags, which are used to aid in collecting, removing and/or cleaning both animate things and inanimate items from home and work. These devices have undesirable characteristics including for example one or more of expense, complexity, difficulty storing and removing from storage, unwieldy to use, difficulty of use in small spaces, needing two hands, requiring power, messy, unsanitary, use of potentially hazardous chemicals, potential for insect stings and/or difficult to use for one or more of the desired tasks. Several devices which are designed to catch various types of insects are discussed and explained by way of example below with respect to aiding in understanding the usefulness, novelty and inventive features of the instant invention.

U.S. Pat. No. 1,346,021 to Harris is for a Sanitary Fly Catcher and Trap. One of the objects of the invention is " . . . the provision of a trap, which may be either placed upon a support and baited to attract flies, or swung through the air above the fly to force the latter through the entrance opening into the trap." The trap comprises a wire receptacle 10 (page 3, lines 51-55) as well as a frusto-conical member 11 (page 3, line 55-59.) Thus, in one manner of use a bait is needed and in another manner it is swung through the air. The device is shown to have mechanically moving parts of some complexity and believed to be cumbersome to store and use as well as being unsuitable for use with anything other than flying insects.

The use of the device with bait as taught may be undesirable to some people due to having to obtain and load the bait into the device, as well as potential undesirable characteristics of the bait itself. Additionally, it appears from the drawing that a person who is swinging the device would need to be careful not to hit anything since the wire and frusto-conical member could cause damage. The shape of the device makes it very difficult to catch a fly which is crawling about or resting in a small space such as the corner of two walls in a room and the like.

U.S. Pat. No. 1,462,416 to McDermott is for a Flycatcher which " . . . has reference to a means for trapping and exterminating flies in a sanitary manner . . . " and " . . . has the appearance of an ordinary fly swatter, but which is in the nature of an open frame having on its sides closely spaced elastic strips . . . whereby, when the device is forced against an article on which a fly to be trapped rests, it will not inflict injury to said article . . . whereby the fly . . . is forced into the trap." (Page 1, lines 8-15.)

While this device is designed to minimize damage to anything while a person is catching a fly by forcing the device against an article on which the fly rests, it nevertheless appears to be heavy and unwieldy as compared to "an ordinary fly swatter." Using the device appears to require some degree of skill in maneuvering it over the fly and forcing it against the article quickly enough to prevent the fly from escaping. Additionally the device appears unsuitable for catching flys which are crawling or resting in tight spaces such as corners. The device also appears to be of some complexity and cost to manufacture with the elastic strips and is believed to be cumbersome to store and not intended for use with anything other than flies.

U.S. Pat. No. 1,623,006 to Hamborg et al. is for " . . . a fly catcher adapted to be held in the hand of an operator and wielded through the air to catch flies in flight, whereby any fly coming in contact with the device is sure to be caught." (Page 1, lines 3-8.) The invention utilizes a cardboard disk, "[t]he front face of the disk is provided with a sticky substance 21 such as now used on fly paper . . . " as part of its design and operation (page 1, lines 18-27 & 72-80.) As seen from the drawing the construction of the sticky cardboard disk and the frame for holding the disk are of some mechanical complexity, leading to difficulty in use and additional manufacturing cost relative to a common flyswatter. Additionally, it does not appear to be possible to catch and then release a fly unharmed.

This device is also believed to be; somewhat difficult to manufacture, cumbersome to store and use, requires a supply of sticky disks which must be removed and replaced when a number of flies have been stuck thereto as well as being unsuitable for use with anything other than flying insects. It does not appear to be suited to catching flies which are crawling or resting in tight places. One questions how the sticky disks are to be supplied, are the cardboard disk and sticky coating supplied as separate components? Is a sticky cardboard disk supplied and if so how is it to be packaged so that the sticky coating remains sticky? Additionally, it is believed that causing an insect to stick to flypaper can result in death by thirst or starvation or possibly by poisoning from the fly paper coating which some people may find objectional.

U.S. Pat. No. 1,718,805 to Wilkie et al. is for an Insect Trap which utilizes " . . . a cup shaped perforate paper member lined with a sticky substance and supported in a wire handle by which insects may be captured by using the device similar to a fly swatter." (First page, lines 5-10.) This device appears to have many of the same problems as with Hamborg et al., not the least of which is the use of a sticky capture element. This device is believed to be cumbersome to store and use, requires a supply of the sticky paper cups (with the same supply problems as Hamborg et al.) and unsuitable for use in tight spaces or with anything other than flying insects.

U.S. Pat. No. 2,247,791 to Sundquist is for an Insect and Fly Catcher using a " . . . flexible self-closing spiral tubular sack . . . constructed of a flexible straight weave net material sewn together to form a tube." (Page 1, lines 38-40.) "In operation, when the spiral sack is swung through the air to catch an insect, the spiral of the sack unwinds and forms a straight sack passing through the air, being expended by the air passing through the mouth of the same. When the momentum of the sack diminishes, the air pressure within the sack likewise diminishes and permits the sack to spiral and close. Should the user get the fly or insect into the mouth opening of the spiral tubular sack, the insect would then be forced to the closure end Z of the insect catcher." (Page 1, lines 13-24.)

As seen from the drawings the frame which holds the spiral sack is round, and the spiral sack appears to be somewhat complex in its construction. The diameter of the opening of the bag relative to the length of the handle makes it appear that the user must have some degree of manual dexterity or skill in order to swing the device fast enough to cause the bag to open while at the same time swinging the bag opening over the flying pest. The size of the bag opening, as well as the structure holding the opening appears to make it unsuitable for use in confined areas where striking an object could cause damage to the object and/or the frame.

The construction is described at lines 40-54. "The lower end of the material of the tube is then clustered together into a ball Z forming a closure for the sack formed from the tube permitting a slight bagging to one side of the sack near its closure end. The stitching 4 which retains the ball Z at the closure end of the sack imparts a pull upon certain longitudinal threads of the net material so as to cause a self spiraling of the material of the sack when the open end of the spiral sack is attached to the loop members 2 of the handle A with the ball Z closure being secured at a bias to the material of the sack causing the sack to form a self-closing spiral X which acts as an insect trap." Thus the construction of the spiral sack is utilized as the manner of trapping the insect once it is caught by swinging the sack in the air.

It is intended that when not in use, the sack can be spirally wound by hand about the handle (page 1, lines 25-30) which has the unintended consequence of potentially putting the insect in contact (through the sack) with the hand which might allow the insect to sting. Sundquist does not explain whether or not, or if so, how the insect is killed by or in the sack or how to remove the insect.

U.S. Pat. No. 2,604,723 to Bennett is for an insect catcher which "in its specific phases to a live cricket catcher." (Col. 1, lines 1-3.) "The catching of crickets involves an entirely different problem from that of the trapping of flies and bugs . . . " (col. 1, lines 14-31.) The device utilizes " . . . a hollow, open-faced, screen member 5 of general pancake shape which is approximately flat on its upper face, . . . . The edges 6 of this screen member 5 are preferably of curved or balloon shape as shown and extend outward beyond frame member 2 in order to help hold the crickets after catching." (Col. 2, lines 35-42.)

"In the use of a cricket catcher having this balloon shaped edge 6 and downward extension 7 the captured cricket, it has been found, runs along the screen to the balloon shaped edge where the peculiar form of same either causes the cricket to run around balloon edge 6 or reverse himself and run back across the fact of the screen without coming up out of the balloon edge of the screen and over frame 2 which would permit immediate escape." (Col. 2, lines 46-56.) "The screen, which is relatively stiff due to its form and shape, should be dark colored . . . " (Col. 2, line 59—Col. 3, line 4.) It is believed that this invention is particularly designed for use with crickets and not as suitable for catching other types of insects. The shape of the screen and its stiffness are believed to be difficult and expensive to manufacturer relative to a common flyswatter. If one attempted to use it to capture other pests it is believed that it would be unwieldy and there would be a problem with scratching the surfaces on which the pests crawl or rest, as well as a problem of keeping them in the device if one were able to get them into it to begin with.

U.S. Pat. No. 4,776,129 to Kelly is for a butterfly net the Abstract describing the device. "A butterfly net is disclosed comprising a stocking cap-shaped netting open at one end thereof. The netting has a hem-line loop formed along the periphery of the open end. A flexible strip of finite length has one portion thereof threaded through the loop, and a second portion thereof extending outside the loop. The butterfly net is provided with an elongated handle member having a longitudinally extending opening. Guide means are provided adjacent the opening for guiding the second portion of the strip into the opening. An actuator is slidably mounted on the handle member, and is coupled to the second portion of the strip. The actuator is movable on the handle between a first position in which the one portion is of one length and the open end of the netting is fully opened, and a second position in which the one portion is of a smaller length and the open end of the netting is at least partially closed for capturing a butterfly."

The size, shape and configuration of the opening make the butterfly net unsuitable for use in tight spaces. The flexible strip is shown as 14 in FIGS. 1 and 5, the strip having a hoop-like portion 20 and an end portion 22. It is seen from the Figures that the strip is of some substantial thickness and stiff enough to keep the net open while capturing the butterfly and thus the person using the device must be careful not to damage something by hitting it with the strip, particularly if the device were used indoors to capture unwanted pests.

The sliding actuator and net mechanism are shown in the figures as having mechanically movable parts and being somewhat complex to manufacture and use. It is believed that two hands are needed to securely capture a butterfly, one to hold the handle and one to slide the actuator after the butterfly is in the net, and that the device is accordingly, somewhat cumbersome to use.

U.S. Pat. No. 5,131,178 to Stoliar et al. is for an insect net described in the Summary of Invention as "[i]n accordance with the present invention a net for the harmless capture of airborne or waterborne insects and for permitting inspection of a captured insect without allowing it to escape includes a pouch formed with netting material attached to a pair of spring arms, these spring arms automatically open an aperture of the pouch when sections of the springs are pivotally released from a slot in a support block. When an insect is snared in the netting material the aperture may be closed to capture the insect unharmed by pivoting the springs to position the section in the slot. A telescoping handle attached to the end opposite the pivot end provides a variable capture distance." The netting material which makes up the pouch " . . . is constructed of a woven springy material, such as Sparkle Illusion White No. 880/108 . . . . This material maintains its shape when unfolded . . . ."

Accordingly, the spring arms and aperture, as well as the "woven springy material" add some degree of manufacturing complexity and attendant cost to the device, as well as creating some difficulty to use and potential to cause damage by hitting an object which the insect is near or on. The size, shape and construction of the spring arms and pouch make the device undesirable for use in capturing an insect in a tight space, for example such as a corner in a room. While not specifically stated, it is believed that two hands are required to open and close the spring arms, one to hold the handle 26 and one to rotate the spring arms 17 about the screw 33 into and out of the slot 23 thereby opening and closing the net 11. Further, as seen from FIG. 2, it is possible for a captured insect to come into contact (through the net) with the hand which manipulates the spring arms thereby creating a potential for an insect sting.

The Bug Net, available for purchase on the Internet on Feb. 12, 2018 (B&W screen shot and URL filed herewith) is an example of a product which is advertised for use in catching bugs. As compared to the instant invention, the Bug Net has a thick frame to which the net is attached which makes it difficult to get bugs to crawl in because of the thickness, and additionally makes it difficult to slide the frame under the bugs in order to scoop one or more into the net. The shape of the frame holding the net, coupled with the large rounded corners makes it impossible to place a corner of the net frame in a corner, for example where two walls in a room meet or where a wall meets the floor, without leaving a large gap where the bug can crawl under or beside the net.

It additionally appears that the net is so long as compared to the shaft between the grip and portion of the frame to which the net is affixed such that when held vertically the bug could come in contact (through the net) with the hand holding the grip of the handle. Having the bug in contact with the hand will be objectional to some people and can be dangerous if the bug can sting through the net. Although the shaft and grip are distinctively shaped, the net is so long (that is, longer than the shaft) it appears that there is nothing in the design of the grip of the handle which can alert the user to the possibility of the hand being close enough to the net frame to create this risk of contact.

The Illuminet Critter Net, available for purchase on the Internet on Feb. 12, 2018 (partial B&W screen shot and URL filed herewith) is an example of another product which is advertised for use in catching bugs and other critters and has similar problems as the Bug Net mentioned above. As compared to the instant invention, the thick frame to which the net is attached makes it difficult to get critters to crawl into the net because of that thickness, and additionally makes it difficult to slide the frame under critters in order to scoop one or more into the net. Further, because of the large radius, as compared to size of many bugs, of the frame part which holds the net, attempting to slide the net under a bug which is smaller than that radius will tend to push the bug under the frame. As with the Bug Net above, the shape of the frame holding the net, coupled with the large rounded corners makes it impossible to place a corner of the net frame in a corner, for example where two walls in a room meet or where a wall meets the floor, without leaving a large gap where the bug can crawl under or beside the net.

The Illuminet Critter Net handle appears from the photo to be a single piece, that is it does not appear to have a separate grip and shaft as with the Bug Net. The handle attaches directly to the portion of the frame to which the net is attached and the net has a length, longer than the light attached to the handle so that when held vertically the critter in the net could come in contact (through the net) with and sting the hand holding the handle. There is nothing in the design which can alert the user to the possibility of the hand being close enough to the net frame to create this risk of contact. Even considering that the hand would feel the light attachment, that attachment is close enough to the net frame that the net can fall below the light and onto the hand when held vertically such that contact of the critter (through the net) with the hand is still a possibility.

As discussed above, some prior art devices are designed to capture flying pests while flying. Other prior art devices may capture pests while they crawl about, but are heavy or otherwise might damage surfaces and objects which the pests crawl on. Some prior art devices are designed to avoid or minimize damage to the surfaces and objects which pests crawl on but the design of those devices is complex thereby leading to high manufacturing costs, difficulty in use and/or difficulty in storage.

Some prior art bags/nets which are designed to hold a pest are sometimes long enough that when a hand is holding the apparatus vertically, the net is long enough that it can fall down over the hand and it can be possible for the pest which falls to the bottom to sting the hand through the bag. Further, while some prior art devices do have designs which prevent the pest from escaping the device once captured, but make it difficult or impossible to subsequently release the pest (or other contents such as inanimate contents, animate droppings or squashed animate pests), and further to release the contents unharmed Brief Summary of the Invention.

The invention described herein in respect to the preferred embodiment by way of example is an easy to manufacture, inexpensive, durable, easy to use and store device providing convenient use in the collection and removal of animate things and inanimate items from locations where they are desired to be controlled or otherwise not wanted. In particular, it is useful as a "no kill" device to capture and remove pests, for example such as flies and spiders, other bugs and various small life forms. The invention provides a particularly useful ergonomic design and shape whereby with one hand a user can collect things and items from corners where two flat surfaces meet, and in particular the corner between a wall and the floor, wall and ceiling and two walls. The things and items are collected into an open bag which, by simple and easy wrist movement of the single hand, the opening can then be closed. This prevents the thing or item from spilling, crawling or flying out.

A lightweight bag, open at one end (which adjoins a frame) and closed at the other end, is used to collect and hold one or more animate thing or inanimate item. The bag is preferred to be flexible or semi flexible, transparent enough that the user can see in, such that the presence of contents of the bag can be visibly recognized. The bag adjoins, and is held open at the open end by, a frame head. The frame head is located at or in proximity to one end of the frame. The frame is preferred to have a handle which is adjoined at or in proximity to one end to the head, the handle intending to be held at or in proximity to the other end by one hand of a person. The end of the handle which is intended to be held may have a grip to facilitate being held by the hand. The portion of the handle not including the grip may be a rod or other type of shaft such that a human may manipulate the frame head and thus the opening of the bag by holding the grip. A human may manipulate the opening of the bag to collect one or more thing or item by manual manipulation in proximity thereto, for example by sliding the bag under the object, scooping the object into the bag or otherwise manipulating the bag and/or object to get the object into the bag.

Once the object is in the bag, if the object is an animate pest which crawls or flys the human may then lift the frame head to a vertical position, causing the bag opening to close thereby preventing the pest inside the bag from escaping. If desired the frame head may then be lowered a bit and rotated causing the bag to drape over the (previously) lower side of the head of the frame to further secure the pest in the bag. Thus, the human will be able to quickly and securely secure the pest in the bag with a minimum of effort. The pest may then be transported to a desired location and released from the bag by twisting the frame so as to open the bag allowing the pest to crawl or fly out.

Another manner of releasing the pest which does not crawl or fly out is by twisting the frame to unwrap the bag from the frame head, allowing the bag to open and fall below the frame head and then quickly moving and flipping the frame in a "U" shaped path, first quickly downward such that the frame head travels around the bag turning it upside down and inside out, this motion being quickly followed by simultaneously rotating the frame head 180 degrees and upward to thereby cause the closed end of the now inside out bag to fall downward. Thus, the pest which was inside the bag is dropped from outside of the inside out bag. This action is facilitated by the particular novel design of the controller which includes the attachment of the bag to the frame head in a manner that the attachment of the open end of the bag is easily rotated about the frame head structure.

Alternatively, the bag may be attached to the inner surface of the frame head opening which will also allow the frame head to pass over the bag with a flick of the wrist thereby also turning the bag inside out and releasing the object inside. In either instance of turning the bag inside out, it will be useful if the closed end of the bag is not as wide as the frame head inner opening. This may be accomplished by tapering the bag in a fashion such that the open end is the larger end.

As compared to some of the above prior art devices, rigid mechanically moving parts, as they are defined herein, are not required to practice the invention in its preferred embodiment, thus eliminating the construction and cost of the invention. A pest may be captured, prevented from escaping and then released simply by manipulating the flexible bag via the handle of the frame. If however one wishes to practice the invention with mechanically moving parts an incur the additional cost and complexity, those capabilities may be resorted to, as will be understood by the person of ordinary skill in the art from the teachings herein.

For example, additional features such as a battery operated light to aid in using the controller may be adjoined thereto, or a detachable stick or other tool to aid in moving the object to be captured into or out of the bag may be included. Other additional features and uses of the invention will be known to the person of ordinary skill in the art from the teachings herein.

The size, shape and arrangement of the parts of the preferred embodiment, including the bag as well as the frame including the head, handle, rod and grip, are provided herein and such can be used to catch and remove flies and other small life forms commonly found in and about areas where humans frequent instead of swatting them and creating a messy biohazard as is done with a flyswatter. Additionally, the preferred embodiment may be easily used to collect inanimate items which will fit through the open end of and be contained by the bag, for example such as spilled cereal, toys and other items which humans may wish to collect.

BRIEF DESCRIPTION OF THE DRAWINGS

Various embodiments of the invention are disclosed in the following detailed description and accompanying drawings.

DETAILED DESCRIPTION AND PREFERRED EMBODIMENT OF THE INVENTION

Figure 1:
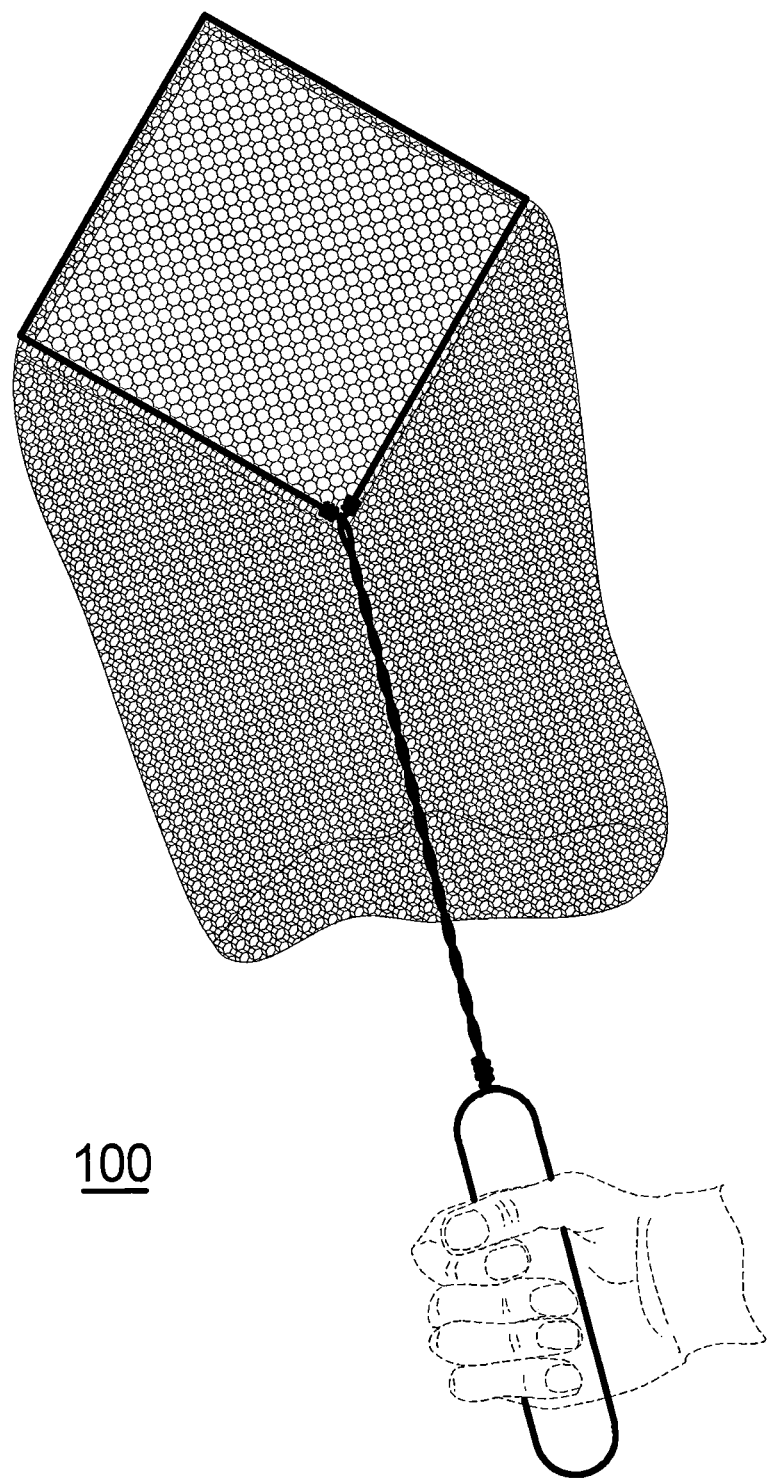
FIG. 1 illustrates a view of the preferred embodiment of the invention, shown as it may be held in the hand in an upright position.

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims which are to be interpreted by what would be known to the person of ordinary skill in the art at the time of the invention from the teachings of the specification and not interpreted in the broadest possible manner.

Numerous specific details are set forth by way of example in the following description in order to provide a thorough understanding and appreciation of the invention. However, the invention may be practiced according to the claims without some or all of these specific details and examples. The specification is written to enable the person of ordinary skill in the technical fields related to the invention (the art) to practice the invention. For the purpose of clarity, technical material that is known by the person of ordinary skill in the technical fields related to the invention has not been described in detail so that the invention is not unnecessarily obscured.

Definitions, Descriptions and Examples.

The Inventor, as his own lexicographer, provides the below definitions and descriptions for some words which are used in the specification and claims. Several of the definitions and descriptions are not the same as the common and ordinary meanings of the word(s) but are instead tailored to the invention to aid in the understanding and claiming thereof. Other words are intended to have their common and ordinary meaning unless used differently as will be known to the person of ordinary skill in the art from the context in which they are used herein.

Adjoin, adjoins, adjoined—to be physically close to or in contact with one another and share a common (actual or defined) border with. Elements may be adjoined by being attached, connected or other combining of separate elements e.g. by welding, glue, fasteners and the like, or may be manufactured together as a single item consisting of differently defined parts e.g. by casting, molding, machining and the like or by a continuing process. For example, the frame consists of a head and a handle which are adjoined, meaning separate head and handle pieces may be fabricated and then attached e.g. by welding, glue, fasteners and the like, or the head and handle may be fabricated as a single piece e.g. by casting, molding, machining (including electrical, chemical or electrochemical machining) or the like, or may be fabricated by a multi step or continuing process e.g. bending and twisting a single wire.

Bag—a flexible or semi flexible open shape container for carrying things, having two ends, one of which has an opening having a cross section (e.g. circular, square, oval or variable due to the flexible nature) and the other a closed end which may have a cross section or be substantially flat. The cross section may have one or more side(s) at the open end, for example a square cross section such as an open paper bag having substantially flat sides whereas a round cross section may have only one side. The bag may be semi flexible such as a thick plastic bag where the open end will remain substantially open (without a frame) when the bag is placed on its side, or a flexible bag where the opening will completely collapse on itself when placed on its side. The closed end may be a separate bottom, or it may simply be a closure of the wall(s) of the bag for example such as by gluing or other fastening together of the side(s).

Corner—a point, vertex or area where a two adjacent sides of an object which define an angle (exclusive of any construction such as corner radius, weld or other blunting or irregularity of the point of the angle at the corner) meet. For example, a corner of the frame head or a corner in a room.

Controller—a device comprising a container having an open end and a closed end, one portion of the open end comprising at least two adjacent sides meeting at a corner and forming an angle (exclusive of any corner radius, weld or other connection which might be utilized at the corner) substantially equal to or less than 90 degrees, the device having a handle by which a person may hold a portion of the handle and manipulate the open end of the container to facilitate collecting one or more animate thing or inanimate item within the container.

Diamond—a Euclidean plane geometric shape (also known as a rhombus), a simple (non-self-intersecting) quadrilateral whose four sides all have the same length. For purposes of this disclosure and the claims a diamond (or other polygon) may not have rigorous vertices (e.g. they may be blunted or radiused at the points) and may have additional three-dimensional components as explained hereinbelow, that is, the shape still has four angles and four sides but they may project into the third dimension. For example, considering a planar rhombus having four angles A, B, C and D with A opposite C and B opposite D. If the corners at angles A, B and C are held in the plane and the corner at angle D is lifted out of the plane in the third dimension (by distorting one or more angles and/or sides), the resulting three dimensional shape (which now defines two planes, ABC and ACD) is still defined herein as a diamond.

Diamond controller—a controller wherein the open end of the container has a diamond shape.

Diamond fly & small object controller—a diamond controller wherein the open end of a flexible bag container has a diamond shape with the handle extending outward from one of the corners.

Elastic limit—the greatest stress that can be applied to a solid body without causing permanent alteration of its size or shape, e.g. bending.

Flex, flexible, flexibility—for purposes of this specification and the claims these terms are defined more narrowly than in common usage as meaning that an object is flexible enough that it will easily bend with the application of force (without exceeding its elastic limit). Materials which are semi-flexible as defined below fall within the definition of flexible.

Flexible bag—a container for carrying things and having wall(s) made of a flexible material (e.g. having a substantially tubular shape and a variable cross section defined by the flexible walls) and two ends, an open end and a closed end. The closed end may but does not need to be made of the same material(s) as the wall(s). The flexible bag of the Diamond Fly & Small Object Controller shown in FIG. 1, is held by the frame head in a substantially square diamond opening cross section and when the frame head is held horizontally the tubular shape of the flexible bag makes a variable cross section transition from the square diamond at the top to a flat, closed cross section at the bottom of the bag. The flexible bag will change shape depending on its position relative to gravity.

Flexible bag test. The following test defines when a bag as used with the preferred embodiment of the invention is considered flexible for purposes of the teachings of the preferred embodiment of the invention as well as the claims. When the frame head to which the open end of the bag is adjoined is held in a plane parallel to gravity (for example any corner of the preferred embodiment frame head is held in the up direction with the plane of the frame perpendicular to horizontal), the entirety of the closed end of the bag falls below a horizontal plane at the lowest point of the head. The test assumes that the structure of the head as well as the length of the side(s) of the bag are such that they do not hold the closed end of the bag above such plane. A similar test can be made with a bag not adjoined to the head. With the thumb and forefinger holding the open top of the bag from above, rotate the thumb and forefinger to point upward. If the closed end of the bag remains or drops below the horizontal plane at highest point of the thumb and forefinger holding the open end of the bag, the bag is considered to be flexible. If a bag is otherwise flexible but does not fall below the horizontal plane to meet one of these tests it is defined as semi-flexible.

Frame—the part of the controller including a frame handle and a frame head. The frame may be constructed in a single piece, for example a single plastic piece which is manufactured by molding, machining, etc. or may be constructed of multiple pieces. The single or multiple pieces may consist of a single or a plurality of materials, for example a strong inner portion consisting of a first material and a protective and/or soft outer material, the two being manufactured for example in a single step, multiple steps or a continuing process.

Frame handle, handle—the portion of the frame which at or near one end adjoins the frame head and extends in a predetermined lengthwise direction away from the frame. The handle is designed so that a person may hold it at or near the other end in order to carry and control the controller in order to manipulate the frame head and thus the open end of the container. The frame handle may be a rod like portion of the frame with a relatively uniform or smoothly changing cross section, or it may have different cross sections defining different parts of the handle. For example, a portion of the handle may include a cross section, fasteners, or other provisions at or near one end for transitioning from the handle to the frame head, a portion at or near the other end with a cross section which provides a comfortable grip for the user's hand, and a portion between and joining those two portions which has a different cross section, for example such as a tube or rod. The handle may be made of a single material, for example such as the wire frame of the figures, or parts of the handle may be made of different single or multiple materials throughout part or all of the handle. For example, the grip of the frame may be comprised of a first material for strength which is covered or coated with another material to facilitate comfortable holding.

Frame head, head—the portion of the frame which adjoins the handle at or near one end of the handle, with the head further providing a portion to which the open end of the container is adjoined. The head has three or more sides adjoined end to end to form and continuously surround an opening. At least two adjacent sides of the frame head are preferred to be straight and define a substantially right angle (90°) corner. The handle is preferred to adjoin the frame on the other side of the opening opposite the right angle corner. The preferred embodiment frame head is a square diamond shape which at least on the sides forming the right angle is made of bent metal extrusion such as wire having a cross section for which the largest (i.e. major) dimension of not more than 1/10 inch.

Frame grip, grip—the part of the frame handle which is intended to be used for a human to hold with a hand in order to facilitate manipulation the frame head and thus the open end of the container. The grip may be included as a portion or substantially all of the handle and is preferred to have a shape which is easy for a person to hold with the hand.

Grip to rod—for a handle which includes a grip portion which is shaped differently from the rod portion, the area where the grip portion makes a cross section transition to adjoin the rod portion. The grip to rod transition may include a particular design or shape to allow the person holding the grip to feel the extent of the grip as it transitions to the rod. The grip to rod area may include a shield to prevent the container from easily contacting the hand.

Mechanically moving part—a part which is a rigid, semi-flexible or springy component movably affixed to another rigid, semi-flexible or springy component. For purposes of this disclosure and the claims the flexible bag is not considered to be a mechanically moving part but rather a flexible part.

Quadrilateral—a Euclidean plane geometric polygon having four edges and four vertices or corners. As with the definition of the diamond above this definition also encompasses shapes which do not have fully pointed vertices, and/or straight sides and/or may have a three dimensional component where the four vertices define two different planes.

Rigid—unable to bend or be forced out of shape by hand (unless broken); not flexible, semi-flexible or springy.

See in (as in see in container, see in bag, see in flexible bag)—the degree of transparency of the side of the container or bag, giving the ability of the person manipulating the container, bag or flexible bag to see inside whereby the contents can be visibly recognized by the person.

Semi-Flexible—for purposes of this specification and the claims meaning that an object is flexible enough to bend when a force (including gravity) is applied (without exceeding its elastic limit) but not enough that it will collapse under its own weight (as in the flexible bag tests) and will return to its former shape when the force is released.

Spring, springy—resilient, that can be pushed or pulled (without exceeding its elastic limit) but returns to its former shape when released. Similar to semi-flexible but may also meet the flexible bag test.

Square diamond—a diamond having four substantially equal length sides.

The preferred embodiment of the invention, its components, their construction, cooperation and use, as well as the manner of using the preferred embodiment are identified and described herein in relation to the Figures. In particular, the invention will be described in respect to the preferred embodiment frame, flexible bag container and their elements. The names of particular ones of the frame parts used in the teachings herein are given in FIG. 3 and will be referred to herein below.

FIG. 1 shows a view of the preferred embodiment 100 of the invention which consists of a wire frame (having a black color in the drawing) which includes a head that continuously surrounds and defines an opening and further includes an elongated handle with a hand grip and a rod of twisted wire between the hand grip and a diamond frame head to which a container consisting of a flexible mesh bag (depicted by thin black lines in geometric shapes) is adjoined. The bag is held open by the head at the bag's top, with the top edge of the bag secured to the frame head which thereby defines the opening in the bag. It will be understood from the instant disclosure that while the square diamond shape is preferred for the head (and bag opening) and a flexible mesh bag for the container, other head shapes and containers may be utilized for practicing the invention in particular environments and situations as desired without departing from the spirit and scope of the invention as set forth in the claims.

As shown in FIG. 1, the one of the four right angle corners of the frame head which is at the top of the drawing, and across the head opening from the point where the elongated handle adjoins the head, will be referred to herein as the right angle corner, even though as a practical matter it will not necessarily have a precisely 90° angle or be precisely planar as will be described herein. This corner is also labeled °5B in FIG. 3. The preferred embodiment elongated handle adjoins the head directly across the head (or bag) opening from this right angle corner with the handle extending in a predetermined lengthwise direction away from and along an imaginary line bisection the right angle corner.

Stated another way, the elongated handle preferably adjoins the head at the crossing (of the head) by an imaginary line which starts at and bisects the interior angle of the right angle corner, continuing across the defined opening to cross and extend beyond the head. The lengthwise direction of the elongated handle is preferred to follow that bisecting line away from the head and its opening. In the preferred embodiment of FIG. 1, this connection point for the handle is the corner across the opening from the right angle (305D of FIG. 3) with the lengthwise direction of the handle following that imaginary line. This is believed to be an important and non-obvious design feature of the invention for several reasons related to the manipulation of the bag opening which will be known from the description below, including that it allows that corner opposite where the handle meets the head to be easily manipulated and placed in corners between flat surfaces, for example the corner between a wall and a floor.

As a practical matter, in some constructions of the head and handle the point at which the handle adjoins the head and the angle of the direction along which it extends may not be precisely as described above, e.g. because of manufacturing tolerances a weld or wire twisting or other design and construction details. The imaginary line might only approximately bisect the right angle and the predetermined lengthwise direction may thus fall on a different imaginary line which is only approximately parallel to the approximately bisecting line, approximately being defined herein in respect to each line as at an angle +/−5 degrees. For purposes of the teachings and claims herein with respect to describing the right angle, the angle of the imaginary bisecting line and the angle of the imaginary line along which the handle extends, the word substantial used in connection with those lines and their angles is to be interpreted as the preferred angle with a tolerance of +/−5 degrees.

Figure 2:
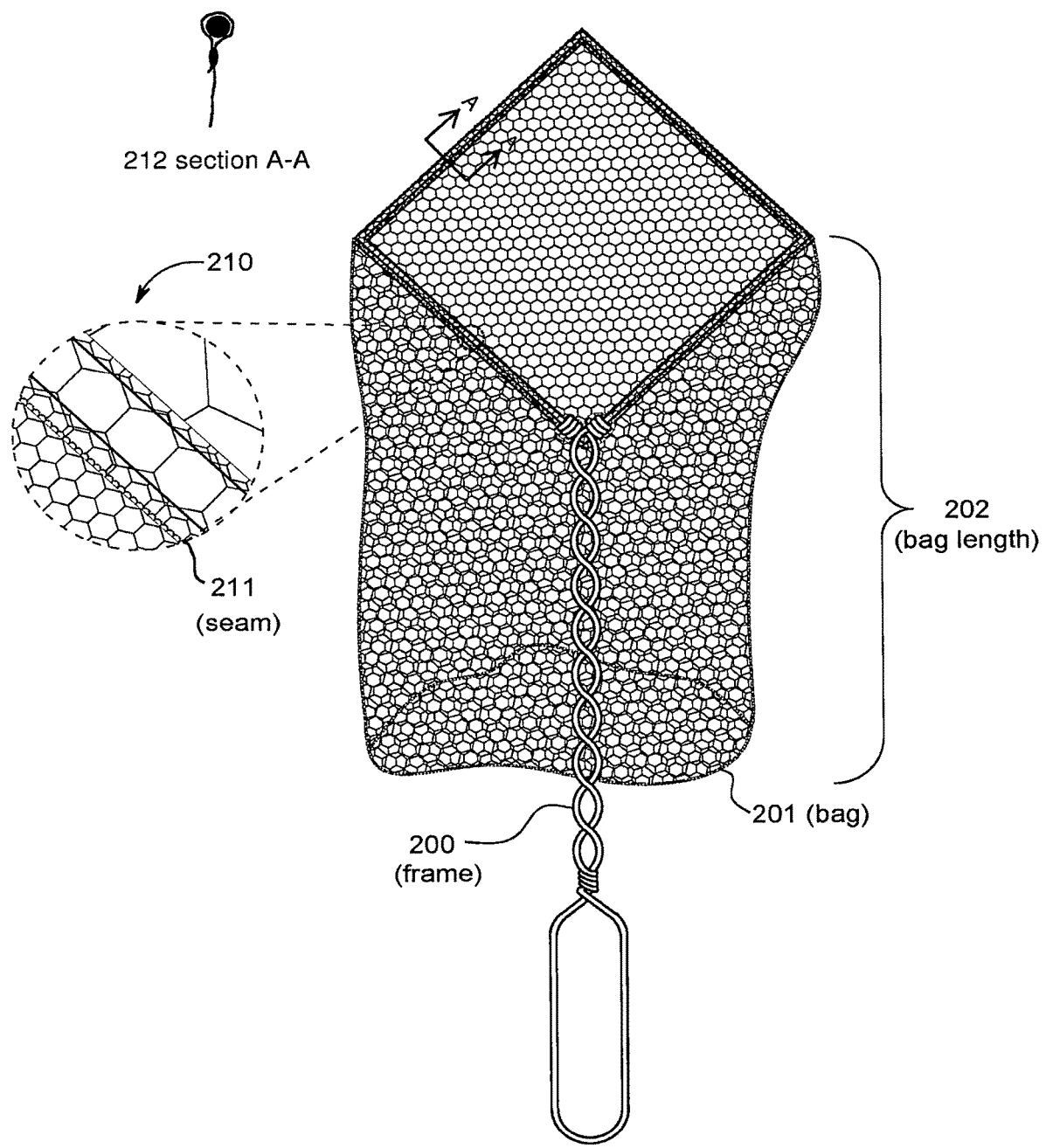
FIG. 2 illustrates the frame and bag parts of FIG. 1 including preferred detail of the stitching of the bag to the frame and the bag length relative to the frame.

The bottom of the bag is closed in order to hold the contents thereof, and in FIG. 1 is shown by way of example with a bottom piece which is stitched to the tubular side (i.e. creating a seam). The FIG. 1 side is shown as a lengthwise portion of a woven tube with a separate adjoined bottom, but may also be woven with the bottom included or as a single piece woven flexible mesh having a woven closed end (e.g. which is not separately adjoined, like a sock) or simply adjoining the sides of the tube at the bottom. Other bag construction methods may be used as desired to practice the invention in a particular environment and manner. For example, the bag may be constructed from a rectangular piece of netting cloth with a vertical seam to create the tube and a horizontal seam to close the bottom of the tube as in many common potato chip bags. The bag may also be constructed from a rectangular piece of netting cloth by folding it at the bottom and seaming the sides as in many common plastic sandwich bags. Other constructions will be known from the teachings herein. In FIGS. 1 and 2 the bag is shown as hanging behind the frame, with a single layer of woven mesh cloth (side) shown within the frame head opening and a double layer of mesh (i.e. the two sides of the collapsed bag) below the frame head.

The preferred embodiment is intended to be manipulated by a single hand, left or right as desired, of a human in order to collect one or more animate thing for example such as an arthropod pest like an insect or spider, or one or more inanimate item for example such as small parts, toys or spilled food, within the container. Wire is preferred for constructing the frame for various reasons which will be apparent to the person of ordinary skill in the art from the teachings herein including for example low cost, ease of manufacture and limiting damage to objects such as by scratching when using the invention. It will be understood however that while wire is preferred to be used for the frame and mesh cloth for the container, other materials and methods and combinations thereof of constructing the frame and container will be useful in achieving a desired degree of capabilities of practicing the invention for a particular environment and circumstances.

FIG. 2 illustrates the wire frame 200 and bag 201 parts of FIG. 1 and shows detail 210 and section A-A 212 as well as 211 showing the stitching of the seam of the bag to attach it to a light colored wire frame. It is preferred that the top of the open edge of the bag is fastened such that it is loosely wrapped about the wire frame in order that the fastening may be freely rotated about the wire. In order to facilitate such rotation, as well as to provide clearances at corners and the adjoining handle area (305D of FIG. 3) the wrap or other fastening may be omitted in these areas, thus it will be understood that the entirety of the bag does not need to be wrapped or fastened and only portions thereof may be so attached.

As with FIG. 1, the bag is shown hanging behind the frame. For initial purposes of explaining the preferred embodiment it will be assumed that the frame 200 is essentially planar, that is, the frame does not depart from a plane except for the thicknesses of the wire and twists. Planar construction is not a requirement for practicing the invention however and the frame may take on a three dimension construction if desired. Note that in FIGS. 2-6 the wire of the frame and the mesh openings of the bag are shown exaggerated in order that the details thereof can be appreciated from the drawing. In reality the wire twists of the shaft are preferred to be tighter and smaller, having a pitch (length of one twist) ranging from 0.75" to 1.5" and the mesh openings are preferred to be much smaller, having a major dimension (the longest distance from any point on one side to the opposite side) ranging from no greater than 0.1" to microscopic (e.g. no-see-um mesh discussed below) which if drawn to scale would make them difficult to appreciate. The mesh bag is shown having a hexagonal structure, however any suitable bag material which is capable of holding the anticipated things or objects as taught herein may be resorted to.

FIG. 2 shows a bag length 202 which is measured from the right corner of the frame head (305C in FIG. 3) to the lower most point of the bag when held vertically. It should be noted that this length is not necessarily the same as the length of the bag from the top corner to the lower point. Depending on the shape of the frame head and the flexibility, weight and shape of the bag, the difference between the two lengths will vary. Importantly, as will be discussed in detail below, the length of the bag will be discussed in regard to three desired conditions, the first condition is with respect to the distance between the lowest point of the bag when the frame is held vertically, the length of the bag when the frame is held at a first angle to the right (in this embodiment 45°) and/or left, which may be different depending on the shape of the frame head and where and at what angle the handle is affixed to the frame head. And the third length, a second angle to the right (in this embodiment 90°) also depending on the shape of the frame head and where and at what angle the handle is affixed to the frame head.

The distinctions between these distances will become apparent to the person of ordinary skill in the art from the teachings relative to minimum and maximum lengths given hereinbelow. Further, the person of ordinary skill in the art will recognize that the shown length 202 is for purposes of explanation and not a rigorously defined measurement for purposes of the teachings or claims, but rather length will be discussed in respect to the longest dimension of the frame head, the side dimension of the frame head, shortest distance of the bottom of the bag relative to the hand and similar measurements. It is noted in passing that in FIG. 2 the lowest point of the bottom of the bag is not necessarily the bottom portion, but may be a point on a side due to the hanging bag being supported in large measure by the attachment of the bag to the left and right corners of the frame head, hence the bag length dimension indication in the drawing.

The bag is preferred to be flexible enough that it will not hold any particular shape and will fall under its own weight due to gravity. The frame is accordingly preferred to have a head portion to which the bag is adjoined to hold the bag opening, a diamond shape in the preferred embodiment, such that the bag may have a reasonable size opening substantially defined by the frame head to facilitate collecting desired items. As shown in detail 210 and in particular at 212 section view A-A, it is preferred that the open end edge of the bag be looped 180° over the frame head wire sides so as to overlap the portion of the bag on the other side of the wire frame by approximately ⅜". The open end edge portion of the bag is stitched or otherwise secured to the portion of the bag on the other side of the frame.

The two layers of bag material are thus adjoined in any desired manner such that they form a tube through which the wire of the frame passes. The tube may also be provided at the open end of the bag in other manners as will be known from the teachings herein. For example, the bag may be placed on the bent wire frame head and then the tube formed, or the tube may be formed on the bag and then the wire of the frame head passed through the tube and then the frame head bent to shape as is convenient in manufacture. Combinations of adjoining the tube and bending the shape of the head may also be utilized. Further, while the drawing of FIG. 2 shows a single tube which is substantially the length of the circumference of the head, the single tube may be broken into more than one, for example one tube or a plurality of tubes for each side of the wire head as desired.

This particular method of attachment using one or more tubes adjoining the open end of the bag allows the bag to freely rotate on the wire frame head. This will facilitate single left or right hand use as will be discussed with respect to FIG. 5. Also, in this manner, and assuming the netting and/or contents have sufficient weight, by manually manipulating the frame such that the bag opening is in an approximately horizontal position, the frame may be flipped upside down with a circular motion. The bottom of the bag is thereby drawn by this circular motion toward the bag's open top and the bag is thus caused to fall through the opening of the frame head. This action turns the bag inside out as compared to the original horizontal opening position. If desired, a relatively heavy net may be utilized, or weighting may be added or affixed to the net, for example at the bottom, to facilitate this action.

It will be appreciated that the open end of a flexible net may be adjoined to the frame head without one or more tubes, e.g. by gluing, molding or use of one or more fastener, which will allow the net to bend at or near where it is adjoined in order be passed through the frame head relatively unimpeded. If the manner of adjoining the open end of the bag to the frame results in the threads or fibers of the bag being bent in a small area in order for such action, it can cause a premature failure in or near the bending area as compared to a freely rotating tube. The use of a separate bending portion such as a hinge like structure, high flexibility or high strength area along with the flexible net may also be used, the separate bending portion having properties which facilitate bending without premature breaking. The separate bending portion may be adjoined to the frame head and the flexible bag adjoined to the bending portion. The bending portion may also be an integral part of the flexible bag or of the frame head.

The bag is preferred to be constructed of lightweight woven material, for example such as that used for mosquito netting which is constructed of woven nylon or polyester thread, such netting having a fine mesh in the order of 165 holes per square inch. The shape of the bag may be created by cutting and seaming, with the seaming being done by sewing, gluing, ultrasonic bonding, or any other method well known in the clothing or bag making arts. If desired, in order to allow use with very small pests, or to make it difficult for larger pests to hold onto the holes, a smaller hole netting may be used. One example of such smaller hole netting is no-see-um grade netting which has approximately 1200 or higher holes per inch, approximately being between 1000 and 1400. Thus in one instance a mesh having between 100 and 400 holes per square inch may be utilized if desired and in another instance 1000 and 4000 holes per square inch may be utilized if desired. Intermediate sizes in the range of 100 to 4000 holes per square inch may also be utilized, further there is no requirement as to the shape of the holes, or that the same number of holes per linear inch need to be used in perpendicular directions or that only one size hole be used in the bag.

Other bag attachment to the head, constructions and material qualities may be chosen to enable a person of ordinary skill in the art to practice the invention with particular inanimate items and/or animate things and in particular environments. For example, qualities such as fire retardance, mold and mildew resistance, non-fraying at cut edges, transparency, color, sunlight resistance, durability, strength, weight and ease of fabrication and cost may be chosen. Such preferred netting is available from numerous suppliers for example MosquitoCurtins.com in Atlanta Ga. and US Netting Inc. in Erie Pa. Further, bag materials other than woven cloth may be utilized for desired applications, and in particular for some applications it may be desired to have a disposable bag or disposable controller which is removably adjoined to the frame head.

Other constructions may also be used for the bag, e.g. weaving, spinning, molding, laminating of threads and threadlike materials, drying, cooling, extruding or otherwise hardening slurries and liquids (e.g. as in making paper, fiberglass and carbon fiber solids), perforating, punching, melting, burning (e.g. as by laser), spinning, drawing and other operations on sheets of, or molded, materials. The materials may be chosen to achieve a desired set of properties for the bag to enable practicing the invention in a particular manner. The bag need not be a net for all methods of practicing the invention, for example a plastic bag or wax or plastic-coated paper bag may be desired for picking up messy food spills. Similarly, other materials and constructions may be used for the frame, e.g. various metals, plastics, fibers, polymers, slurries and liquids may be formed to a desired shape of the frame or parts thereof by any construction or process. These changes will be known to those of skill in the art to be chosen for suitability for a desired set of specifications and level of performance in a desired environment and situation for practicing the invention from the teachings herein.

Figure 4:
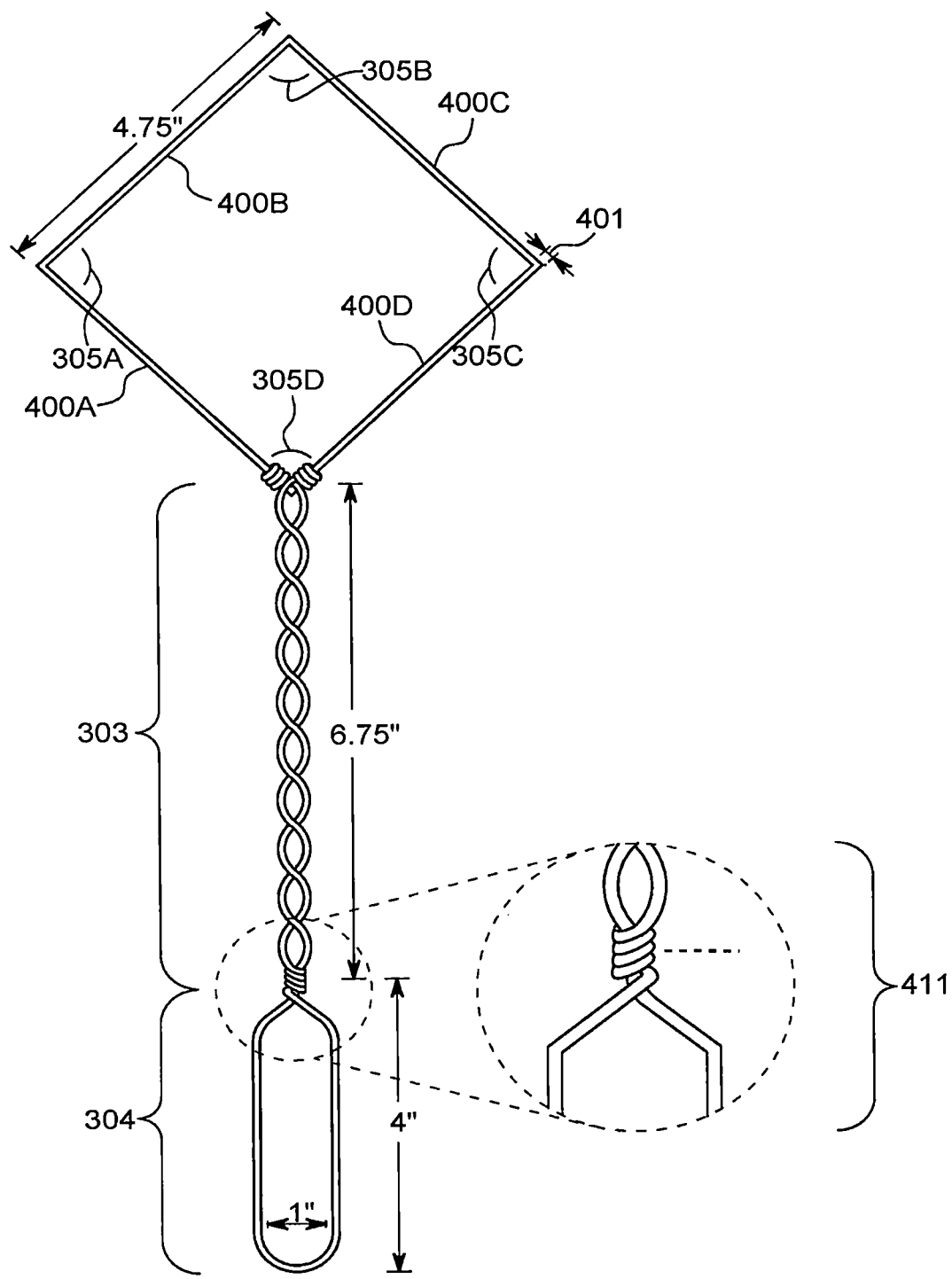
FIG. 4 illustrates still further details and parts of the frame of FIGS. 1 & 2.

For the preferred embodiment some dimensions of the frame, including the major cross section dimension 401, are given in FIG. 4. With these, the dimensions of the bag are preferred to have a circumference at the open end (that is around the frame head) of 19" and the length from the frame head to the bottom of the bag (not 202) of 10". The width of the bag when the frame head is held in a vertical plane will generally be less than half the circumference, depending on where along the length of the bag it is measured and how many folds the sides take. The preferred embodiment length of the frame, from corner 305B to the bottom of the grip is 17¼" and the bottom of the bag will thus be approximately (due to bag stretching and other tolerances) 7¼" from the bottom of the frame, or approximately 3¼" above the top of the grip, leaving a good margin above the hand to prevent accidental stings which would otherwise result from the bag touching the hand. The correct length of the bag relative to the size and shape of the frame head and the length of the handle are important to optimally practice the invention and not obvious because of several factors which must be considered and will be explained by way of example below.

It will now be assumed that a thing or item has been maneuvered into the bag and the bag is being held vertically as shown in FIG. 2. The bag's size, shape and in particular its circumference and length (e.g. not too long or too short) are important to safety and ease of use. This will be explained by way of examples as follow with respect to the general case use of the square diamond frame head. It will be understood that the two main general principles of the length of the bag are with respect to the shortest distance from the lowest point of the bag to the hand holding the handle at any angle by which the handle is held below the bag and the length of the bag necessary to achieve desired closures of the opening of the bag when the frame handle is held at different angles relative to vertical.

It is preferred that the frame handle include a grip for the user to hold with the top of the grip being separated from the lowest point of the bag when held vertically as shown in FIG. 2 so the lowest point of the bag does not fall below the top of the handle and at no point contacts the hand. For many constructions, the lowest point of the bag will also be the bottom of the bag, however this is not necessarily the same for all angles of the frame, bag constructions and shape of the frame head which may be utilized. In this respect the following description will at times refer to the bottom of the bag, but it will be appreciated that it is the lowest point of the bag when they are not the same. In particular, for the preferred embodiment of the invention shown in the figures, when held vertically as shown in FIG. 2, it is preferred that the distance between the bottom of the bag and the top of the grip be approximately ½ the length of the longest side of the frame head which holds the bag open but in no event less than 1" to prevent the hand from inadvertently coming in contact with the bag or the bag's contents which may flow or project through the bag. This preferred distance may however be reduced if a shield is provided at the top of the grip (not shown) to physically separate the bottom of the bag and the fingers.

Figure 3:
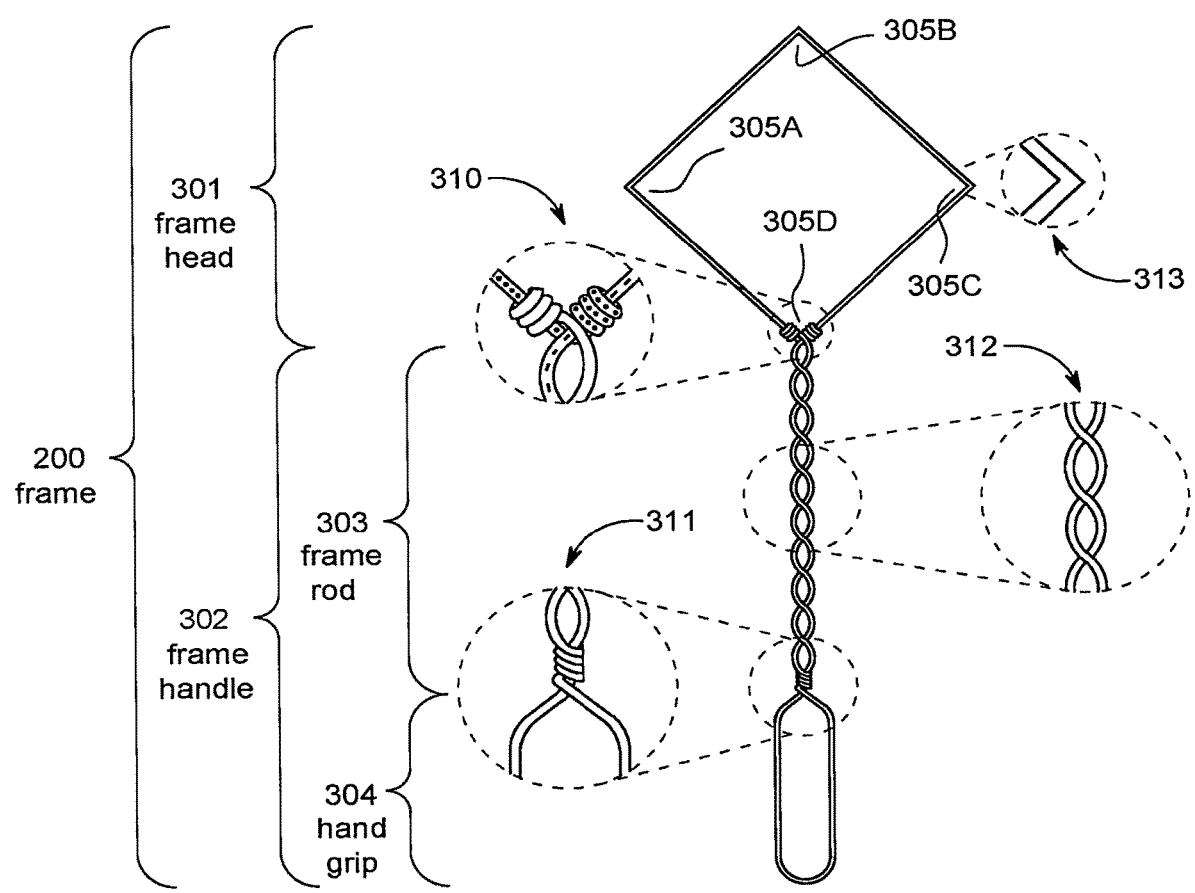
FIG. 3 illustrates further details and arrangement of the frame of FIGS. 1 & 2 and parts thereof.

The distance from the lower most portion of the frame head to the length of the bag, when the frame rod and head are held at different angles, is of importance in practicing the invention. When the frame is held such that the bag falls downward, such as toward the hand gripping the handle, e.g. in a vertical position as shown in FIGS. 2 & 3, it is important that the bottom of the bag extend below the lowest part of the frame head which supports the bag opening by more than the expected amount of the bag needed to hold the contents. That is, the objects contained in the bag should fall entirely below the lowest part of the frame head opening (assuming the object is at the bottom of the bag). It is also important that the side of the bag (near the bottom) which is furthest from the user, will fall freely enough that it pushes the side of the bag nearest to the user to contact the lowest part of the frame head, which in this example is where the corner 305D adjoins the frame handle, when held vertically. This is also true for when the frame is held at angles other than vertical. For example, when holding the frame horizontally such that the top of the opening is corner 305A, the bottom of the bag should fall below the lowest part of the opening, corner 305C. Which in the preferred embodiment those distances are the same, they may not be when other shapes of frame head and bag flexibility are used.

One reason for this importance is so that the bottom of the bag extends below the opening and the sides of the collapsed bag are pushed (by the weight of the bag and its contents) into corner (305D and 305C respectively in the above example) the lowest part of the opening, and the adjoining frame head, to prevent the contents from spilling, crawling or flying out. This is true for any angle at which the handle is held relative to vertical with the plane of the frame head in a vertical position. One reason for this is that in many instances the frame head will be held in a vertical plane with the bag stretched out somewhat horizontally and resting against a horizontal surface such as a floor when the bag and/or object are manipulated to cause the object to enter the bag. The next desired step is to immediately lift the bag and object upward while simultaneously rotating the frame head to a somewhat horizontal plane in order for the object to fall to or near the bottom of the bag. Once that happens the handle is rotated to place the frame head in a vertical plane thus closing the bag opening. Further actions, including rotations of the frame head are then performed if desired to secure the closure.

For purposes of this explanation, and in reference the figures, and using the preferred dimensions of FIG. 3, it will be assumed that the bottom ½" of the bag is needed to hold whatever is in the bag. The bag length then should be at least the distance from corner 305B, the top of the opening, to corner 305D, the bottom of the opening, plus ½". For the preferred 4.75" dimension of each side of the frame head, the corner to corner distance is approximately 6.7" (ignoring the width of the wire and twists) which gives a desired minimum bag length for this example as 7.2". This length thus allows the operator to scoop up the object, let it fall to the bottom of the bag and raise or twist the handle to place the frame head in a vertical position to close the opening and secure the object in the bag. One of ordinary skill in the art will recognize that this minimum length will change depending on the size and shape of the frame head, as well as where and the angle at which the handle adjoins the frame head. Of course, this minimum needs to be considered in conjunction with the length of the handle to ensure the desired space between the bottom of the bag and the hand.

Next it is also desired that the bag be long enough to be easily wrapped, at least partially, around some portion of the frame head in order to further close the opening, thus preventing the contents from spilling, crawling or flying out. The best manner of closure is to wrap the bag around a lower portion of the frame opening. When held vertically as shown in FIGS. 2-4 for example, rotating the frame about any horizontal axis (at least for less than 180°) in the plane of, or parallel to the plane of the frame head likely will not improve closure of the opening. Rotating away from the user will undo the closure and rotating toward the user will be difficult and limited due to the angle of the wrist. Thus, the user will likely begin by tilting the frame to the left or right if the user wishes to further improve closure of the opening.

Consider for example that the vertical handle shown in FIGS. 2 & 4 is tilted 45° to the right from the vertical position shown and the bag falls behind the handle. That places the frame head side 400B at the top of the opening and the side 400D at the bottom of the opening. Again, using the ½" assumption, the bag should hang below the lower edge 400D by at least more than the distance between 400B and 400D plus ½". In this manner the bottom of the bag can be wrapped against the bottom of the opening 400D by rotating the frame clockwise a few degrees or more about the lower edge 400D. The rotation would be CCW if the bag falls in front of the handle. For this frame shape that minimum dimension is less than the minimum dimension needed to have the bag lower than the corner 305D (the diagonal measurement is more than the side measurement). If the bag is made long enough that the bottom of the bag hangs more than ½" plus the height of the opening, which now, because of the 45° tilt to the right is only 4.75". The frame can then by rotated clockwise about the axis defined by side 400D. The bag then wraps around 400D by a corresponding angle. The collapsed bag however may be wider than the width of that side 400D, depending on how many vertical wrinkles or folds the collapsed bag sides contain and the wrapped bag may not contact the frame at all points. Nevertheless, even the parts of the bag which do not contact the frame will still serve to ensure that the contents are not spilled, crawl or fly out of the bag.

If instead the bag length is two times the distance between 400B and 400D plus ½" the clockwise rotation about 400D will first cause a wrapping about 400D by a corresponding angle up to 180° plus wrapping against 400B for that amount of rotation more than 180° (and less than 360° thereby creating a double closure. This will help to compensate for the collapsed bag width possibly being wider than the side 400D. As above, one of ordinary skill in the art will recognize that this minimum length will change depending on the size and shape of the frame head, as well as where and the angle at which the handle adjoins the frame head.

The operator may choose to wrap the bag around a corner of the frame head instead of a side to help to ensure the full width of the collapsed bag is wrapped against the frame head. Here, consider the wrapping starts by tilting the frame 90° to the right such that the handle is horizontal which places corner 305A at the top and 305C at the bottom. The handle can be rotated to wrap the bag first against 305C and next against 305A, assuming sufficient bag length. Again, the width of the collapsed bag may be more than the diagonal length and the bag may not be in contact with the frame at all points. The desired minimum length of the bag, thus depends in part on whether the user desires to be able to provide a single closure wrap or a double closure wrap and whether a 90° tilt is to be used so that wrap is around the corners of the frame head, or a 45° tilt is used to wrap around the side of the frame head, or some other angle is used for the wrap and the width of the folded bag and desire to have a certain amount of the bag in contact with the frame when wrapped. A longer bag requires more bag material as well as a longer handle to ensure the bag does not contact the hand when the frame is turned vertically leading to higher cost. A longer bag may also make it difficult to get a pest which holds on to the side of the bag to fall to the bottom so a longer bag is not necessarily more desirable.

For the preferred embodiment dimensions shown in FIG. 4 that the bag has a length which is more than double the length of the longest side of the frame head opening plus the amount of bag needed to contain the object. With the 4¾" side length as in FIG. 4 and an extra ½" for contents, the bag length is preferred to be 10 inches. That allows at least one 180° wrap around the frame edge when twisting the handle for any roughly horizontal position the handle is in. Depending on the flexibility and weight of the bag and the weight and size of the object the bag may not firmly press against the frame at all points on the frame, but the wrap will provide a sufficient closure of the opening to hold most objects. Additional length may be provided if more than ½" is needed for contents or more wraps desired.

FIG. 3 illustrates details and parts of the preferred embodiment frame. The entirety of the frame is shown as 200, which consists of a frame head 301 and a frame handle 302, which again are assumed to be essentially planar for purposes of this description. The frame handle is preferred to include a hand grip 304 and a frame rod 303. The frame is preferred to be constructed of 16 to 14 gauge soft annealed steel wire with a round cross section, the wire being treated to prevent rust, e.g. by painting, galvanizing or other coating. There are different wire gauge standards used throughout the world however the American Wire Gauge (AWG) standard is widely used in the U.S. Due to manufacturing tolerances the diameter of steel wires varies somewhat but are generally in the range of: 16 gauge diameter is 0.051", 15 gauge 0.057" and 14 gauge 0.064".

As a reference 14.5 gauge soft annealed steel wire (dia. 0.061") is commonly used to manufacture inexpensive painted wire coat hangers and was widely used as farm baling wire until the late '80s. This wire still has many industrial uses e.g. baling cardboard and wood scraps, is produced in large quantities and is inexpensive as compared to other steel wire. Such wire may be utilized in the preferred embodiment frame of the invention. Number 14.5 gauge soft annealed steel wire has an elastic limit such that if held by a human at the grip (e.g. as shown in FIG. 1) applies a force against an object with the frame head, the twisted wire frame rod of the preferred embodiment will bend beyond its elastic limit if only a few ounces-force, in the range of 2 ounces-force to 6 ounces-force, of force is applied. The elastic limit is well known in the art as the greatest stress that an elastic solid can sustain without undergoing permanent deformation. The twisted design, wire size and wire type helps to prevent damage or scratching if the frame head inadvertently strikes an object. This particular wire size gives a good tradeoff between strength, flexibility, bending to prevent damaging objects, cost and ease of manufacture.

Other wire sizes, cross section shapes and wire materials may be utilized to fit a particular combination of strength, protection from scratching or otherwise damaging objects, manufacturability, cost and other desired qualities may be utilized. Further, there is no requirement that the frame is all constructed of the same material, size, cross section shape, etc. however using a single size steel wire is preferred for reasons including low cost and ease of construction. Frame construction utilizing other than wire may also be resorted to in order to fit particular needs for practicing the invention. In addition to selecting a wire size and strength for protection against damaging objects by inadvertently striking, the looping of the bag around the frame head to form a tube provides additional protection against damage as will additional padding of the frame if desired.

It is also preferred that the frame handle be treated to provide one or more additional layer of a rubber or rubber like coating to provide for easier gripping by the hand, or additionally the entire frame be coated as further protection from rust and as padding of the frame to help avoid damaging objects. Performix® brand Plasti Dip® Multi-Purpose Rubber Coating has been found to work well. Treating the wire used for the frame may be performed before bending to fabricate the frame, or the frame may be fabricated first and then treated, or combinations of the two resorted to. The wire may be galvanized or painted before fabricating the frame and the frame then sprayed with or dipped in the rubber coating. It is preferred that the frame, its coating(s) and the bag be substantially waterproof to enable the controller to be washed periodically with soapy water or other cleaner. It is further desirable that controllers used for picking up relatively clean items such as toys be water and heat proof as well as of substantial construction to enable them to be washed in a dishwasher. It is desirable that controllers used in industrial areas where chemicals, for example petroleum based products, be constructed in a manner and from materials which provide resistance to such chemicals.

Both the paint and rubber coating, as well as the bags, may be of any desired color or combinations of colors. It is desirable to have a plurality of controllers available in the home or office, for example one for removing pests, one for picking up food and similar messes dropped on the floor and one for picking up relatively clean items such as parts or toys in order that the unsanitary things being picked up do not leave residue behind on the controller which would contaminate the relatively clean items. Using different colors for the controllers will serve to allow the user to select the correct one for each task. A use specific label can be added to the controller for each color, for example "pests" with red coatings, "toys" with blue coatings, "messes" with yellow coatings. The label can be added to the controller in numerous ways which will be known to the person of ordinary skill in the art from the teachings herein, for example molded, printed or screened on the frame and/or bag. The labels may also be or include icons or other symbols instead of text, for example an arthropod, toy, pet, or garbage bag.

The wire construction of the preferred embodiment frame may be accomplished by a single piece of wire or multiple pieces of wire, the wires being bent and twisted as shown in the various figures. FIG. 3 for example shows details of the preferred embodiment construction with a single piece of wire. A length of wire is first bent, starting approximately the circumference of the frame head from the middle, into the shape of the grip and the two halves are twisted tightly at the top of the grip as shown in 311 to provide a strong grip to rod portion with a distinct feel at the top of the grip. This particular arrangement helps the user to recognize when one or more fingers is placed at or above the top of the grip which aids in keeping fingers and hands away from the bottom of the bag when the head of the frame is raised vertically. This is particularly helpful when the bag holds a stinging pest, thus preventing the bag from coming in contact with the fingers or hand and avoiding being stung.

The rest of the frame handle may then be fabricated by twisting the two halves of the wire in a tight twist similar to that shown in 312. Note again that the drawings show some of the various twists in large and exaggerated form for purpose of explaining the preferred embodiment. For example, the twist in 312 would be much longer as compared to the tight section of 311 but the spaces between the twisted wires in 312 would not be present, such as shown in FIG. 1.

At the top of the handle the longer of the two halves of the wire is bent as shown in 310. In 310 assume that the wire marked with dashes is the longer half. That wire is bent 45° to the right to make the right part of corner 305D, and then 90° to the left to make corner 305C, then 90° to the left to make corner 305B and again 90° to the left to make corner 305A where it becomes the wire shown in 310 as marked with dots. That end is then tightly wrapped around the dashed wire, just to the right of corner 305D. To finish the frame, the shorter half of the wire from the handle, shown as the unmarked wire in 310, is tightly wrapped around the dotted wire. Any excess length of wire may be trimmed away, however it is anticipated that with careful, automated manufacturing the process can be started with a piece of wire cut to precisely the proper length to make the frame and not have any excess to trim.

The corners of the head, for example 305C shown in detail in 313 may be essentially square if desired, although with some types and thicknesses of wire that may be difficult to achieve. It may be noted that when speaking herein of the corner angle, for example 90° as for 305 A-C, the angle is described as if the corner is square. In other words, the angle is described ignoring any radius, fastening (e.g. welding, twisting) and the like which causes the corner to not be square.

The frame construction shown in the preferred embodiment of FIG. 3 is believed to be a good compromise of the various factors mentioned above, including for example strength, bending to avoid scratches and other damage to objects, attachment of the bag, manufacturability and cost, ease of grabbing the grip and manipulating the bag opening (as held by the frame head) in order to achieve and practice a low cost but useful preferred embodiment of the invention.

It will be understood that while the frame is assumed to be essentially planar for purposes of explanation as described above, that the frame may also take on three dimensional characteristics, for example the frame may be bent away from, or from and back to, the plane of the drawing. One example is that the frame rod 303 may be displaced at a vertical angle with respect to the plane defined by the frame head 301, for example by bending the rod 303 upward at corner 305D. Or, the rod may be bent upward at 305D and the grip 304 then bent at the top to bring the plane defined by the grip parallel to the frame defined by the head 301. The two vertical angles will be equal, and the displacement of the two planes, that is the vertical displacement of the grip 304 relative to the frame head 301 will depend on that angle. That displacement will be useful in providing room for a hand on the grip thereby allowing the frame head 301 to be held flat against a flat surface such as a wall. Otherwise the preferred embodiment rod is springy and may be flexed by a small amount to assist in holding the frame head flat against a flat surface.

FIG. 4 shows the preferred embodiment of the invention with preferred dimensions and a detail 411 of a typical change which may be made to the frame without departing from the spirit and scope of the inventive concepts. In particular 411 shows changing the top of the grip from radiused bends to sharp bends. This makes it somewhat easier for the operator to distinguish the top of the grip thus assisting in preventing the bag contacting with the fingers or hand. Another change which is shown at angle 305D is the use of a separate frame head with square corners. The top wires of the rod 303 are both twisted around the separate frame head at corner 305D. The frame head may be constructed of a single piece of wire which is first bent to shape and the ends then fastened (e.g. by spot welding) to create a continuous head section. It will be understood that different dimensions, shapes of bends and twists as well as methods of fastening and other construction may be resorted to in order to practice the invention with particular frame and bag construction.

In this respect, the handle 301 may be attached to the head 302 at a point on a portion of the frame head which is opposite corner 305B. In this respect, opposite is defined as the area of the frame head 301 which lies between and is defined by two imaginary lines which originate at the vertex of the angle 305B and extend across the opening and the frame head, one of which is 15° to the right and the other 15° to the left, of a line which bisects angle 305B. Thus the opposite area is within a 30° angle centered on the imaginary line which bisects angle 305B.

The handle 302 may optionally depart corner 305D from an angle other than that bisecting the 270° angle from the handle side of head sides 400A and 400D angle (or 90° if looked at from inside the frame head), namely other than 135° (or 45° from inside the head). For example, it is desirable to have the handle depart at 120° from side 400A (150° from 400D) instead of 135°. This will allow flexibility in holding the edge 400B or 400C against a surface. If the handle were arranged at 135° either of those edges can be held against a surface if there is room, however if there is an obstruction such as a piece of furniture or shelving which prevents holding one of those edges against the wall between the shelves, having the 120° angle from side 400A might allow the side 400C to be held against the wall.

Also, when holding side 400C against the floor, the 120° angle will cause the grip 304 to be somewhat closer to perpendicular which means that the user doesn't have to bend over as far. If desired, the length of the rod 303 may be increased to facilitate that bending problem. Such increase in length may be facilitated by making the rod longer or utilizing a mechanically adjusted rod such as a telescoping or folding (e.g. in a Z shape) rod or an attachable extension for example one which threads into the bottom of the rod or grip and which can be clipped to the side of the rod when not in use.

As further examples of changes which may be resorted to without departing from the inventive concepts, a frame head other than the square diamond shown for the diamond controller in the figures may be utilized. Quadrilateral and diamond shapes or even other polygons may be utilized instead of the square diamond. Curvilinear or combinations of curvilinear and rectilinear shapes are also possible. It is preferred however that at least two straight sides with a substantially 90° angle therebetween, the 90° angle being at the top of the frame head, be used. One reason for this is to allow the controller to be placed tightly into corners such shown in FIG. 5. This will help prevent a small item or pest which is being captured from passing between the frame head and one of the flat surfaces forming the corner.

Figure 5:
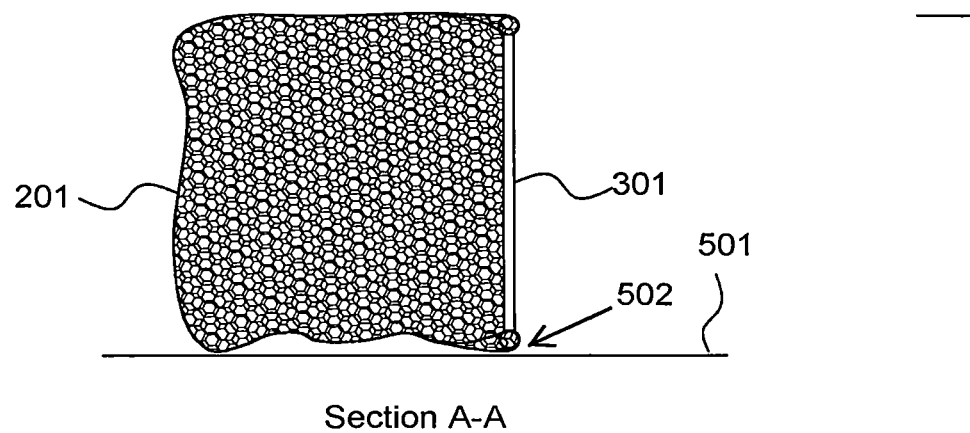
FIG. 5 illustrates the use of the preferred embodiment of the invention where a wall meets the floor.
Figure 5:
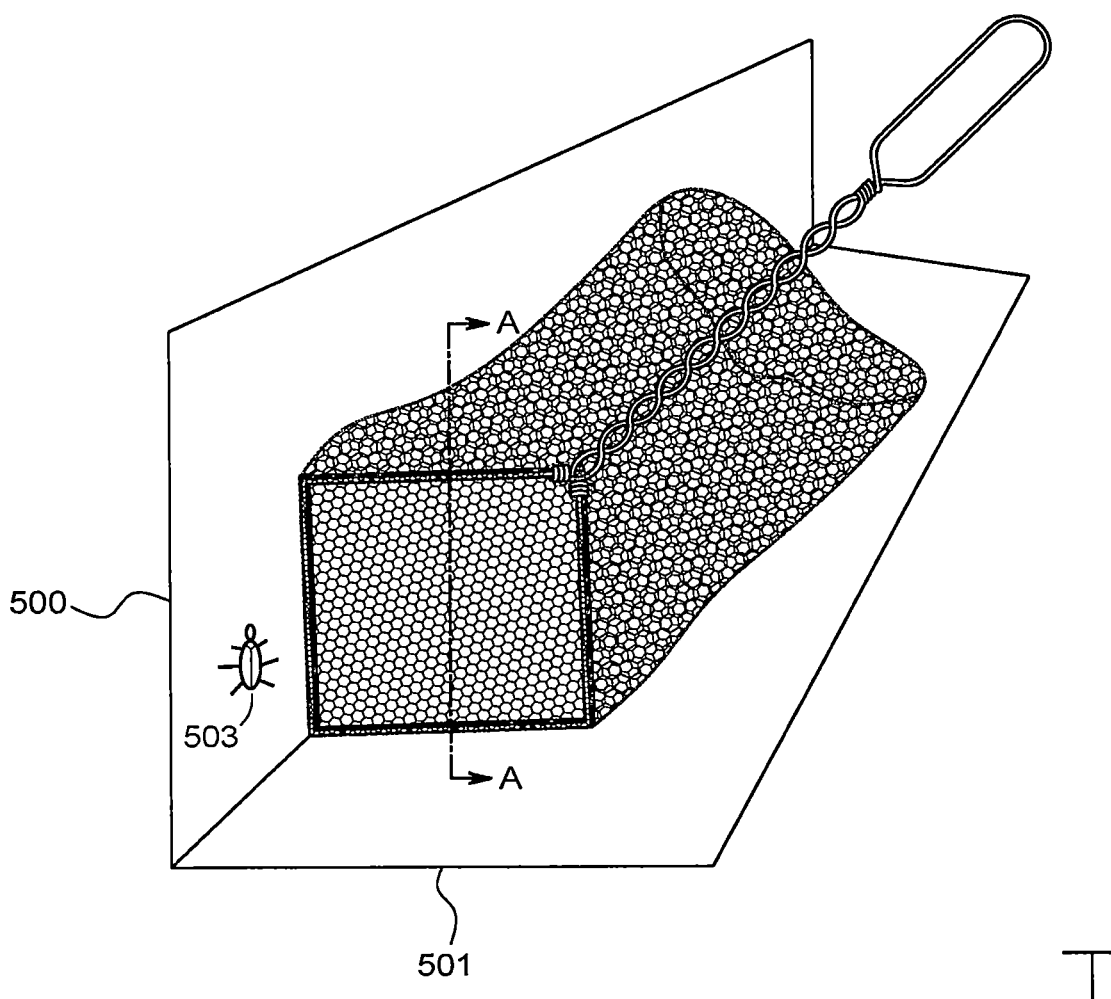

FIG. 5 shows the Diamond Fly & Small Object Controller as used to catch an insect 503 which is crawling on a wall 500 near the corner of that wall and a floor 501. In particular the substantially 90° angle at corner 305B allows the user to position corner 305B in the corner of the wall and floor in order that the head may be slid under the insect or other object to scoop it up causing it to fall into the bag. Alternatively, the bag may be placed close to the insect and the insect be allowed to crawl into the bag, or if necessary the insect or object may be prodded into the bag with a stick or other tool. Such stick or other tool may if desired be removably attached to the controller, for example by use of spring clips on the rod 303.

The FIG. 5 section A-A shows how the substantially 90° angle at corner 305B allows the head 301 to be held against the floor 501 with a very tight fit leaving little or no space between the frame (side 400B) of the head 301 and the floor, shown as space 502. Similarly, the frame side which is simultaneously held against the wall also has little or no space. Even if the insect 503 falls, crawls or jumps from the wall to the floor during efforts to capture it in the bag the insect will still have difficulty escaping under or around the frame head. Additionally, it will be recognized that the height of the cross section created by the frame (referred to herein as a lip), in this instance the diameter of the wire, immediately above 502 is an important consideration in the use of the invention. A cross section having a lip with a large vertical dimension will make bagging the object more difficult than a small vertical dimension. The large dimension will make it more difficult to slide the lip under the object or to otherwise get the object into the bag. It is preferred that the maximum vertical dimension of the lip cross section be 1/10" with smaller being better as long as strength of the frame is sufficient to prevent undesired bending or breaking. In this respect cross section shapes other than round may be utilized, for example such as rectangular, square or oval or combinations thereof with the minor or smallest dimension being aligned vertically to provide the lowest lip.

It will be seen from FIG. 5 that the two sides of the head in contact with the floor and wall are desired to be straight and meet at a substantially 90° angle. The other two sides which meet the handle can be other than straight if desired, or can instead be a single side thus forming a triangle with the other two sides. Further, the single side can be a curved side if desired. It is preferred however that the head be the square diamond shape, coupled with the twisted construction of the wire frame also has an artistic design quality.

Once an insect is in the bag, the grip is promptly lifted and twisted by the person, causing the head (and bag) opening to rotate to the horizontal position. This causes the insect to fall to the bottom of the bag without danger of the insect stinging a finger or the hand through the bag. The head is then lifted or rotated to a vertical position causing the opening to be closed as described above and preventing the insect from escaping. For extra security the head may be rotated beyond vertical causing the bag to wrap around the lower side of the head (400D). If the little pest hangs on to the bag by grabbing a hole, the bag can be shaken to dislodge the pest and cause it to fall to the bottom. If such holding is a concern the use of the aforementioned no-see-um grade netting which has approximately 1200 holes per inch will help to prevent that from happening.

Once safely in the bag with the opening closed, the insect can then be transported to an area where it can be released. Rotating the grip to again open the bag will allow the insect to fly out, unharmed, to a new home. If the insect should be reluctant to leave, then the previously described flipping the frame to turn the bag inside out, thereby causing the insect to fall off of the bag may be necessary. The weight of the insect will help in that action. Alternatively, the previously mentioned stick or tool can be use to push the bag inside out and/or tapping the bag to assist in persuading the little pest that it is time to go.

Figure 6:
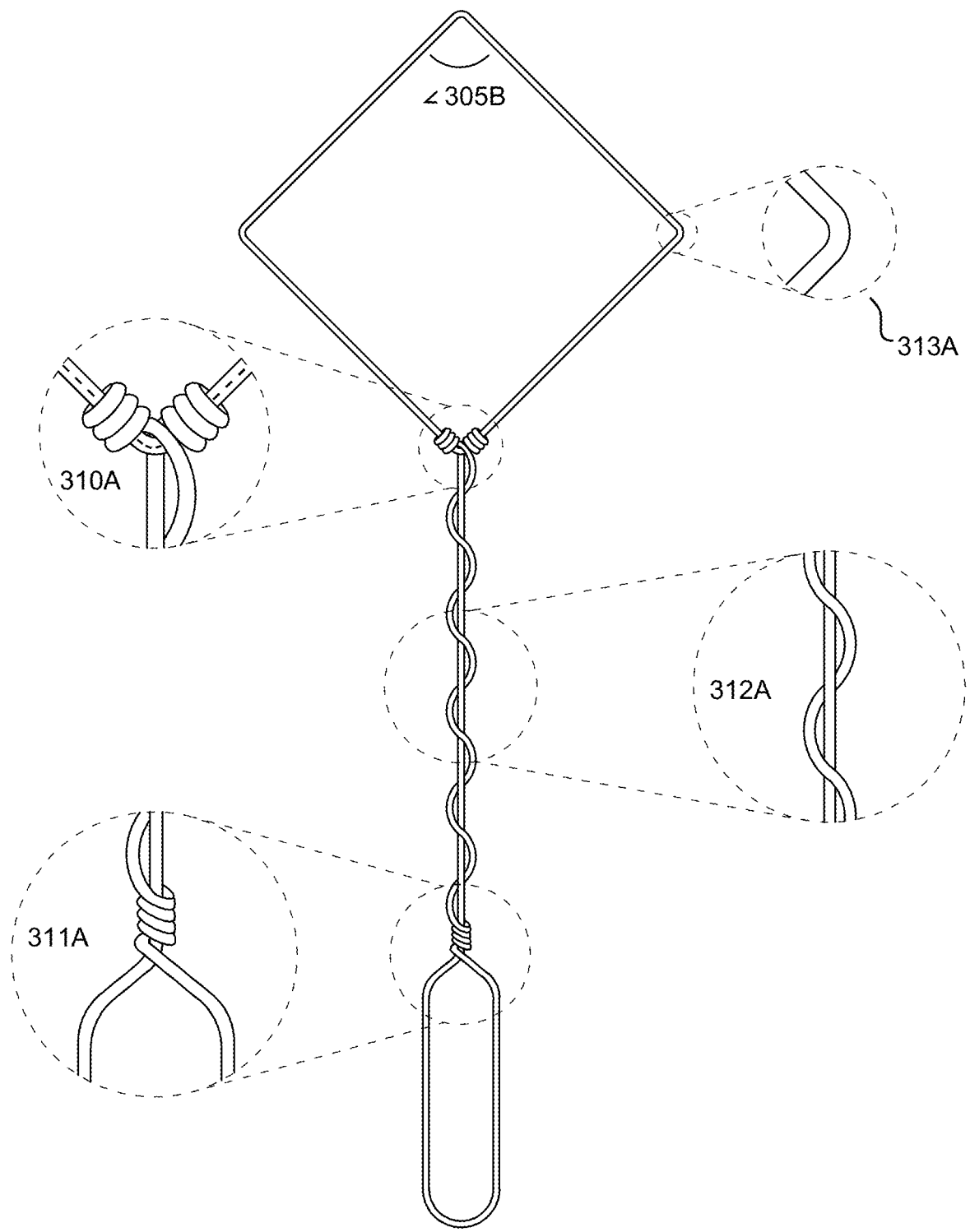
FIG. 6 illustrates alternative arrangement and construction of parts of the frame of FIGS. 1 & 2.

FIG. 6 shows more optional changes to the design of the frame which may be resorted to for ease of manufacture and lower cost. These features also have artistic design qualities. As previously mentioned, the angle 305B is desired to be substantially a 90° angle. It and the other angles are shown with a small 0.1" radius detailed in 313A. Other radius sizes may be used but it should be kept in mind that with larger sizes there will be an opening that will be left between the radius and the corner of the flat surfaces (e.g. wall and floor, wall and ceiling, wall and wall, etc.) through which the pests and objects may be able to escape. Detail 310A shows the connection of the handle to a closed frame head (wire marked with dashes) which was discussed above.

Detail 311A and 312A show an alternate twist which may be used for the rod 303. Instead of the two wires being twisted together as shown in FIGS. 1-5, one wire is twisted around the other which is kept straight. This has the benefit of using slightly less wire to make the rod, as well as having an artistic design quality.

The disclosed embodiments are illustrative, not restrictive. While specific configurations of the preferred embodiment have been described, it is understood that the present invention can be applied to a wide variety of needs to manually bag small inanimate items and animate things without the need for complex devices.

There are many alternative ways of implementing the invention. While a preferred embodiment of the invention has been shown and described with particularity, it will be appreciated that various changes and modifications may suggest themselves to one having ordinary skill in the art upon being apprised of the present invention and from the teachings herein. Such changes shall include but not be limited to different designs, constructions, materials and arrangement of parts of the invention, as well as combinations thereof with other devices, in order to configure the invention to operate with a desired set of features and specifications. It is intended to encompass all such changes and modifications as fall within the scope and spirit of the inventive concepts as set forth the appended claims.

What is claimed is:

1. An apparatus for use by a human to bag, transport and release small objects comprising:
   a. a frame having a head and a handle,
   b. the head having four wire sides bent to form a square diamond shape with right angle corners including a right angle corner, the head defining and continuously surrounding an opening,
   c. the frame having an elongated handle with a first end and a second end, a grip portion and an adjoining a rod portion, the grip portion located at or near the first end and shaped in a manner to be held by a human hand with the rod portion made up of twisted wire and extending to the second end of the elongate handle where it adjoins the frame at the corner which lies on an imaginary line which originates at and bisects the right angle corner the elongate handle extending lengthwise and away from the head and opening in a direction along the imaginary line,
   d. a container having a closed end an open end and a side, the open end adjoining and being held open by the frame head, the side being transparent so that the human manipulating the frame can see in.

2. The apparatus as claimed in claim 1 wherein the frame is constructed from 16 to 14 gauge soft annealed steel wire with a round cross section.

3. The apparatus as claimed in claim 1 wherein the frame is constructed from 16 to 14 gauge soft annealed steel wire with a round cross section and spray or dip coated with a rubber or rubber like coating.

4. The apparatus as claimed in claim 1 wherein the container is constructed from flexible woven mesh cloth.

5. The apparatus as claimed in claim 1 wherein the container is constructed from a single piece woven flexible mesh having a woven closed end.

6. The apparatus as claimed in claim 1 wherein the container is flexible and has a length wherein when the frame is held vertically with the right angle corner at the top, the bottom of the container extends at least one half inch below the lowest part of the opening and not closer than one inch to the top of the handle.

7. An apparatus for use by a human to bag, transport and release small objects comprising:
   a. a frame having a head and a handle,
   b. the head having four sides to form and continuously surround an opening with at least a first and a second adjacent sides being straight and defining a substantially right angle corner,
   c. the frame handle being elongated with two ends, a grip portion located at or near a first of the handle ends and shaped in a manner to be held by a human hand, and a rod portion extending to the second end of the handle where the second end adjoins the frame head at position directly on the other side of the opening from the right angle corner, the rod portion extending lengthwise and away from the head and opening in a direction along a line originating at the right angle corner,
   d. a flexible mesh bag having a closed bag end an open bag end and a bag side, the open bag end adjoining and being held open by the frame head, the bag side being transparent so that the human manipulating the frame can see through the bag side to contents inside the bag.

8. The apparatus as claimed in claim 7 wherein the mesh bag has a length wherein when the frame is held vertically with the right angle corner at the top, the bottom of the container extends at least one half inch below the lowest part of the opening and not closer than one inch to the top of the handle.

9. The apparatus as claimed in claim 7 wherein the frame is constructed from 16 to 14 gauge soft annealed steel wire with a round cross section.

10. The apparatus as claimed in claim 7 wherein the frame handle is spray or dip coated with a rubber or rubber like coating.

11. The apparatus as claimed in claim 7 wherein the open end of the mesh bag is fastened to the frame head such that portions thereof are rotatably wrapped around the wire sides.

12. The apparatus as claimed in claim 7 wherein the flexible mesh bag has between 100 and 400 holes per square inch.

13. The apparatus as claimed in claim 7 wherein the flexible mesh bag has between 1000 and 1400 holes per square inch.

14. The apparatus as claimed in claim 7 wherein the frame is constructed of a single piece of coated steel wire having a round cross section.

15. An apparatus for use by a human to bag, transport and release small objects comprising:
   a. a frame having a head and a handle and constructed out of 14 to 16 gauge steel wire,
   b. the head having four wire sides bent to form a square diamond shape with right angle corners including a given right angle corner, the head defining and continuously surrounding an opening,
   c. the frame having an elongated handle with a first end and a second end, a grip portion and an adjoining a rod portion, the grip portion located at or near the first end and shaped in a manner to be held by a human hand with the rod portion made up of twisted wire and extending to the second end of the handle where it adjoins the frame at the corner which lies on an imaginary line which originates at and bisects the given right angle corner the handle extending lengthwise and away from the head and opening in a direction along the imaginary line,
   d. a mesh bag and having a closed first bag end an open second bag end and a bag side, the open second bag end fastened to the frame head such that portions thereof are rotatably wrapped around the wire sides, the bag side being transparent so that the human manipulating the frame can see contents inside of the bag.

16. The apparatus as claimed in claim 15 wherein the frame is constructed of a single piece of coated steel wire having a round cross section.

17. The apparatus as claimed in claim 15 wherein the rod is constructed such that when the human holding the grip portion applies a force greater than six ounces-force to an object with the frame head, the rod will bend beyond its elastic limit.

18. The apparatus as claimed in claim 15 wherein the mesh bag is constructed of a single piece woven flexible mesh having a woven closed end.

19. The apparatus as claimed in claim 15 wherein the mesh bag is constructed of a single piece of mosquito netting with the closed end constructed with a sewn seam.

20. The apparatus as claimed in claim 15 wherein the frame is constructed from a single piece of coated 14.5 gauge soft annealed steel wire.

* * * * *